(12) United States Patent
Matsueda (10) Patent No.: US 8,434,588 B2
(45) Date of Patent: May 7, 2013

(54) EXHAUST DEVICE FOR VEHICLE INTERNAL COMBUSTION ENGINE

(75) Inventor: Koji Matsueda, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 263 days.

(21) Appl. No.: 12/676,260

(22) PCT Filed: Sep. 5, 2008

(86) PCT No.: PCT/IB2008/002300
§ 371 (c)(1),
(2), (4) Date: Mar. 3, 2010

(87) PCT Pub. No.: WO2009/031015
PCT Pub. Date: Mar. 12, 2009

(65) Prior Publication Data
US 2010/0192558 A1     Aug. 5, 2010

(30) Foreign Application Priority Data
Sep. 6, 2007 (JP) ................................. 2007-231655

(51) Int. Cl.
*F01N 1/06* (2006.01)
(52) U.S. Cl.
USPC ............................ 181/206; 181/238; 181/239
(58) Field of Classification Search .................. 181/206, 181/232, 238, 239
See application file for complete search history.

(56) References Cited

U.S. PATENT DOCUMENTS

| 5,966,932 A | 10/1999 | Yahagi | |
|---|---|---|---|
| 6,026,930 A * | 2/2000 | Ogisu et al. | 181/228 |
| 6,279,965 B1 * | 8/2001 | Kida | 285/268 |
| 6,595,320 B2 * | 7/2003 | Hwang et al. | 181/253 |
| 6,804,955 B2 * | 10/2004 | Bassani | 60/313 |
| 2003/0121720 A1 * | 7/2003 | Chang | 181/254 |
| 2004/0069562 A1 * | 4/2004 | Kondo et al. | 181/227 |

FOREIGN PATENT DOCUMENTS

| DE | 197 43 446 A1 | 12/1998 |
|---|---|---|
| DE | 197 22 146 B4 | 11/2006 |
| EP | 0 279 710 A1 | 8/1988 |
| JP | 1-195908 A | 8/1989 |
| JP | 04-066722 A | 3/1992 |
| JP | 5-256130 A | 10/1993 |
| JP | 9-317461 A | 12/1997 |
| JP | 2000-179337 A | 6/2000 |
| JP | 3111712 B2 | 9/2000 |
| JP | 2004-108227 A | 4/2004 |
| JP | 2005-105918 A | 4/2005 |
| JP | 2005-105919 A | 4/2005 |
| JP | 2005-248767 A | 9/2005 |
| JP | 2006-183473 A | 7/2006 |

* cited by examiner

*Primary Examiner* — Jeremy Luks
(74) *Attorney, Agent, or Firm* — Sughrue Mion, PLLC (57) ABSTRACT

In a exhaust device for an vehicle internal combustion engine, an exhaust pipe (20) of an engine (11) branches at a branching point (B) into a downstream-side first branch pipe (32) and a downstream-side second branch pipe (33). A first silencer (36) is attached to the first branch pipe (32), and a second silencer (37) is attached to the second branch pipe (33). The first branch pipe (32) and the second branch pipe (33) are different in at least one of bending rigidity and mass so that when the first branch pipe (32) and the second branch pipe (33) are vibrated in a specific vibration frequency range, vibrations of the two branch pipes (32, 33) cancel out each other at the branching point (B).

7 Claims, 5 Drawing Sheets

EXHAUST DEVICE FOR VEHICLE INTERNAL COMBUSTION ENGINE

BACKGROUND OF THE INVENTION

1. Field of the Invention

The invention relates to an exhaust device for a vehicle internal combustion engine. In particular, the invention relates to an exhaust device for a vehicle internal combustion engine that emits the exhaust gas discharged from a multi-cylinder internal combustion engine mounted in a vehicle to the outside after the exhaust gas is divided and passed through at least two silencers.

2. Description of the Related Art

Lately, exhaust devices for vehicle internal combustion engines adopt a so-called duel-pipe exhaust system in which the exhaust pipe is branched at a downstream side into left and right branch pipes, and each of the branch pipes is equipped with a silencer, and exhaust gas is emitted from left and right exhaust outlets in a rear portion of the vehicle, since the system facilitates the enlargement of the volumes of the silencers, and is excellent in design characteristic.

In a known related-art exhaust device of this kind for a vehicle internal combustion engine, for example, the exhaust pipes extending from the two banks of a V-type engine are merged into a single pipe that extends through a catalyst device and a pre-muffler, and the exhaust gas having passed through the pre-muffler is divided in flow and led into left and right rear mufflers via branch pipes, whereby the exhaust gas is silenced (see, e.g., Japanese Patent Application Publication No. 2005-248767 (JP-A-2005-248767)).

Besides, in another known exhaust device, in order to shut off roll vibration during operation of the engine, an upstream-side portion of each of the left and right exhaust paths is equipped with a ball joint (spherical pipe joint) that permits the immediately upstream and downstream exhaust pipes to oscillate relatively to each other, and a flexible pipe is attached immediately downstream of one of the left and right ball joints so as to absorb vibration displacements other than the permitted oscillations (see, e.g., Japanese Patent Application Publication No. 09-317461 (JP-A-09-317461)).

However, in the related-art exhaust devices for vehicle internal combustion engines as described above in which a downstream-side portion of the exhaust pipe is divided and led via branch pipes to the left and right rear mufflers for silencing exhaust gas, the left and right branch pipes (branching pipes) are provided in substantially the same shape, taking into account the left-right exhaust balance (equal amounts of exhaust gas, and similar exhaust sounds). Therefore, the left and right rear mufflers and branch pipes having relatively large masses tend to vibrate in such phases that the vibrations thereof overlap each other at the branching point between the branch pipes. Therefore, in a specific vibration frequency range, for example, in the idle vibration range, the vibrations of the left and right rear mufflers and branch pipes in substantially the same phase strengthen each other, and then are transmitted to the vehicle body side, resulting in a problem of vibration unpleasant to an occupant occurring in a cabin floor or the like near the driver's seat. In particular, in the case where the front pipes connected to the front and rear exhaust manifolds have unequal lengths as is the case with a transversely mounted V-type engine, there are many constrains regarding the arrangement of ball joints at the downstream end side of the front pipes, and transmission of vibrations from the engine easily occurs, thus giving rise to the following problem. That is, vibration tends to occur in the floor beneath the driver's feet, in the idle vibration range of, for example, 30 Hz to 40 Hz in the case of a six-cylinder engine, and the vibration becomes conspicuous due to the vibration transmitted from the side of the left and right rear mufflers and branch pipes.

SUMMARY OF THE INVENTION

The invention provides an exhaust device for a vehicle internal combustion engine which is capable of restraining vibration unpleasant to an occupant from occurring due to an exhaust structure in which exhaust gas is divided in flow and emitted via at least two silencers.

In an exhaust device for an vehicle internal combustion engine in accordance with an aspect of the invention, an exhaust pipe of the internal combustion engine mounted in a vehicle, branches at a branching point into a downstream-side first branch pipe and a downstream-side second branch pipe, and a first silencer and a second silencer are attached to the first branch pipe and the second branch pipe, respectively, and the first branch pipe and the second branch pipe are different from each other in at least one of bending rigidity and mass so that when the first branch pipe and the second branch pipe are vibrated in a specific vibration frequency range, vibrations of the first branch pipe and the second branch pipe cancel out each other at the branching point.

Due to this construction, during operation of the internal combustion engine, as exhaust gas is discharged sequentially from the cylinders after the explosion stroke, the first branch pipe and the second branch pipe both equipped with the silencers are vibrated due to pulsation of the exhaust pressure in the exhaust pipe, or the like. However, in the specific vibration frequency range, vibrations of the first branch pipe and the second branch pipe cancel out each other at the branching point, so that the vibration amplitude in the upstream side of the branching point is restrained, and the transmission of vibration to the vehicle body side is restrained. Therefore, the construction restrains the occurrence of vibration unpleasant to an occupant in a specific vibration frequency range due to the exhaust structure in which exhaust gas is divided in flow and emitted via the first and second silencers. In addition, by making the first branch pipe and the second branch pipe different from each other in at least one of bending rigidity and mass, the resonance frequencies of the two branch pipes can be set so as to suitably stagger the vibration phases of the two branch pipes in the specific vibration frequency range so that when the first branch pipe and the second branch pipe are vibrated in the specific vibration frequency range, vibrations of the two branch pipes cancel out each other at the branching point.

In the foregoing exhaust device, one branch pipe of the first branch pipe and the second branch pipe may be provided with a pipe joint that permits the one branch pipe to partially bend at an upstream side of the silencer provided on the one branch pipe.

Due to this construction, while the arrangements and the exhaust pipe passage lengths of the first branch pipe and the second branch pipe are kept substantially the same, the resonance frequencies and the vibration modes of the two branch pipes can easily be made different from each other so that the two branch pipes vibrate in substantially opposite phases in the specific vibration frequency range. Thus, the transmission of vibrations to the vehicle body side can be more effectively restrained. Furthermore, by adjusting the bending rigidity of the pipe joint portion, the resonance frequency of the branch pipe equipped with the pipe joint can easily be adjusted.

In the foregoing exhaust device, the pipe joint may include: a seal member provided on one end-side pipe portion of the one branch pipe; an engagement member provided on another end-side pipe portion of the one branch pipe; and a spring element intervening between the one end-side pipe portion and the another end-side pipe portion so as to urge the seal member against the engagement member, and the one end-side pipe portion and the another end-side pipe portion may be connected so as to be oscillatable relatively to each other, with the engagement member being in contact with the seal member.

This construction allows the one end-side pipe portion and the another end-side pipe portion of one of the first and second branch pipes to be oscillatable relatively to each other with a predetermined bending rigidity while restraining the leakage of exhaust gas at the pipe joint portion through the use of the seal member.

Furthermore, in the foregoing exhaust device, the engagement member and the seal member may be in a spherical contact with each other, and the one branch pipe may be partially bendable in an arbitrary direction.

This construction heightens the degree of freedom in the mount postures of the branch pipes and the silencers, and makes it possible to reliably seal the pipe joint portion.

The pipe joint may be made up of a flexible pipe-shape member that intervenes between the one end-side pipe portion of the one branch pipe and the another end-side pipe portion of the one branch pipe.

This construction also allows the one end-side pipe portion and the another end-side pipe portion of one of the first and second branch pipes to be oscillatable relatively to each other with a predetermined bending rigidity while restraining the leakage of exhaust gas at the pipe joint portion.

In the exhaust device, the exhaust pipe may be supported on a vehicle body side of the vehicle, at an intermediate portion of the exhaust pipe upstream of the branching point at which the exhaust pipe branches into the first branch pipe and the second branch pipe, and the first silencer and the second silencer may each be supported on the vehicle body side of the vehicle, and the first branch pipe and the second branch pipe may be supported by the intermediate portion and the first and second silencers.

Due to this construction, the first branch pipe and the second branch pipe are supported so as to be vibratable according to their respective bending rigidities.

According to the foregoing aspect of the invention, vibrations in the specific vibration frequency range of the first branch pipe and the second branch pipe both equipped with the silencers cancel out each other at the branching point between the two branch pipes, so that the transmission of vibration to the vehicle body side is restrained. Hence, vibration unpleasant to an occupant is restrained from occurring due to the exhaust structure in which exhaust gas is divided in flow and emitted via the first and second silencers.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the invention will be described hereinafter with reference to the drawings.

Figure 1:
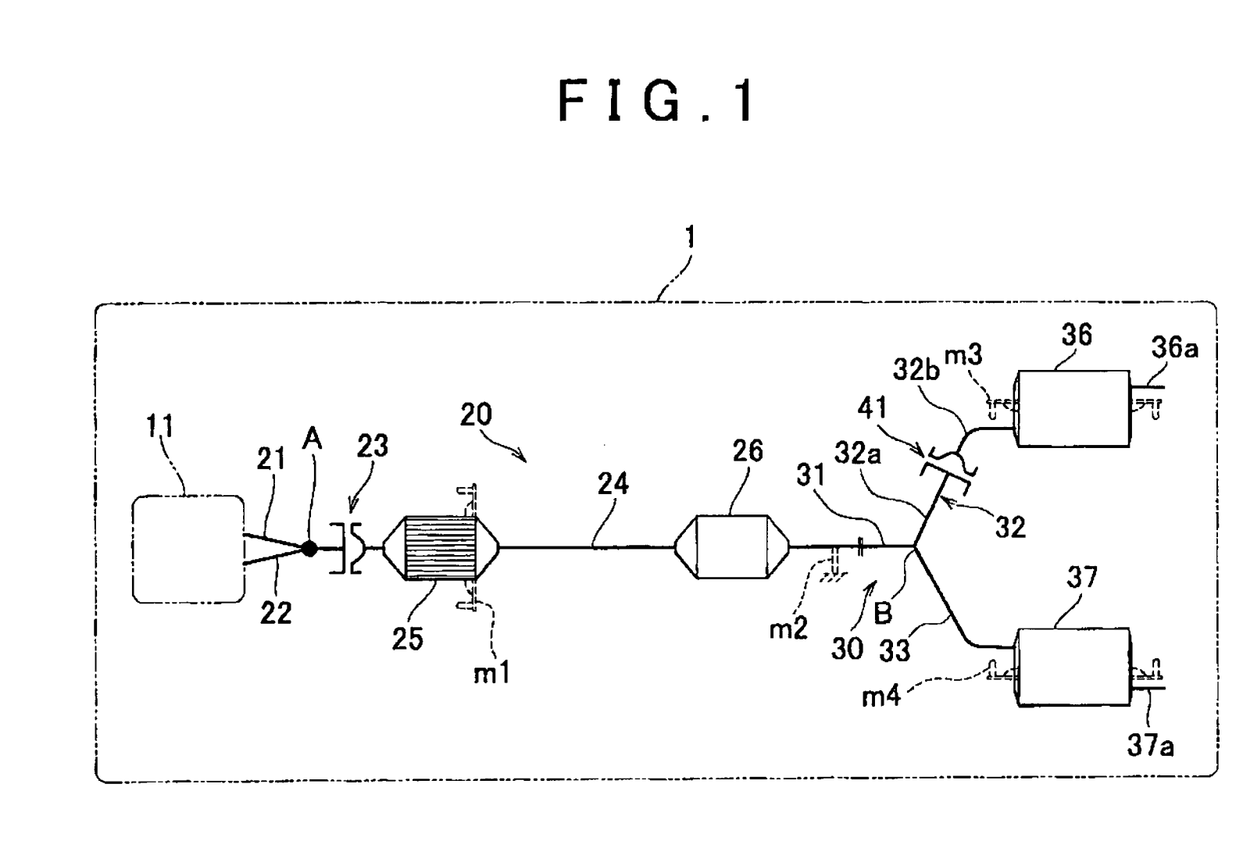
FIG. 1 is a schematic diagram showing a general construction of an exhaust device for a vehicle internal combustion engine in accordance with a first embodiment of the invention.
Figure 2:
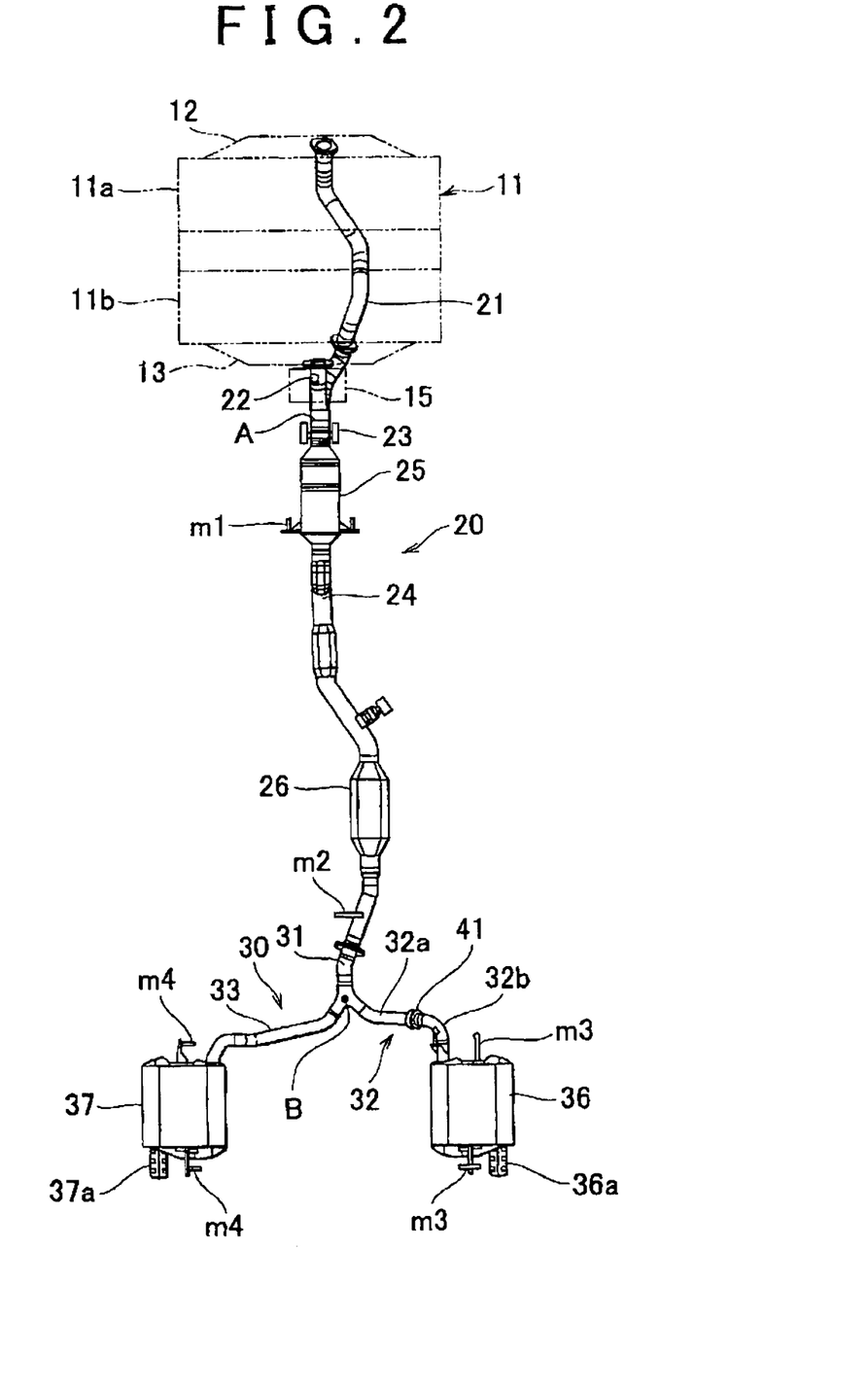
FIG. 2 is a plan view showing an exhaust pipe layout of the exhaust device for a vehicle internal combustion engine in accordance with the first embodiment of the invention.
Figure 3:
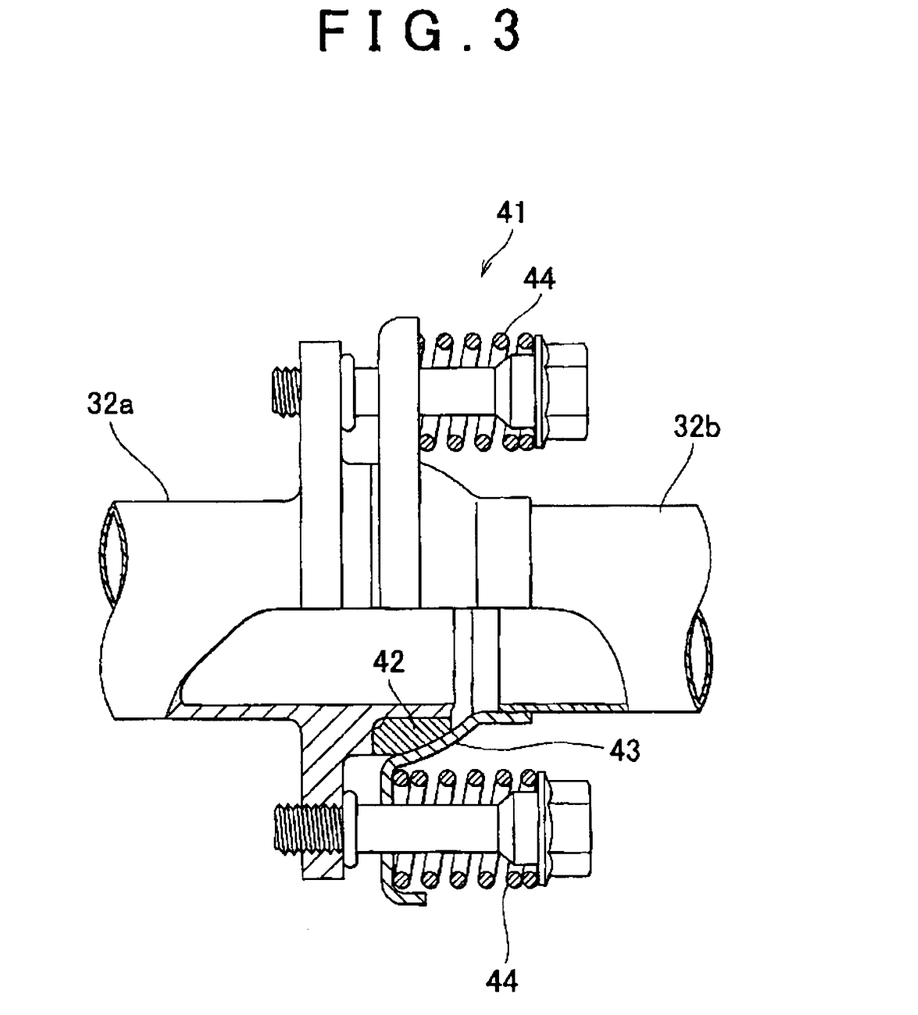
FIG. 3 is a partial sectional front view of a pipe joint that is attached to one of branch pipes of the exhaust device for a vehicle internal combustion engine in accordance with the first embodiment of the invention.

(First Embodiment) FIG. 1 is a schematic diagram showing a general construction of an exhaust device for a vehicle internal combustion engine in accordance with a first embodiment of the invention; FIG. 2 is a plan view showing an exhaust pipe layout of the vehicle internal combustion engine; and FIG. 3 is a partial sectional front view of a pipe joint that is attached to one of branch pipes of the exhaust device.

As shown in FIGS. 1 and 2, in the first embodiment, an engine 11 that is a vehicle internal combustion engine is constructed as, for example, a multi-cylinder internal combustion engine having six cylinders in a V formation that is transversely mounted (details thereof not shown). Specifically, the engine 11 is supported on a vehicle body (not shown) of a vehicle 1 by left and right-side engine mounts (not shown) and a rear-side engine mount 15, and has a pair of banks 11a, 11b for three cylinders each. Exhaust manifolds 12, 13 disposed on both sides of the engine 11 are fastened to the banks 11a, 11b via fastening members (not shown) so that exhaust gas is discharged from the banks 11a, 11b of the engine 11 into the exhaust manifolds 12, 13.

Besides, although not shown in detail in the drawings, the exhaust manifold 12 has a plurality of exhaust introduction portions that are connected to exhaust ports of first to third cylinders formed in the front-side bank 11a of the engine 11, and a junction pipe portion to which the exhaust introduction portions are joined. The exhaust manifold 13 has a plurality of exhaust introduction portions that are connected to exhaust ports of fourth to sixth cylinders formed in the rear-side bank 11b of the engine 11, and a junction pipe portion to which the exhaust introduction portions are joined.

The exhaust device for the vehicle internal combustion engine of the first embodiment, as shown in FIG. 2, includes a first front pipe 21 and a second front pipe 22 into which exhaust gas from the engine 11 is introduced via the exhaust manifolds 12, 13. The first front pipe 21 is longer in passage length than the second front pipe 22, and is connected to the junction pipe portion of the exhaust manifold 12. The second front pipe 22, shorter in passage length than the first front pipe 21, is connected to the junction pipe portion of the exhaust manifold 13.

The first front pipe 21 and the second front pipe 22 merge at a point of mergence A, and are connected to a center pipe 24 via a front ball joint 23. The mergence herein merely means a structure of mechanical linkage from the first front pipe 21 and the second front pipe 22 to the single center pipe 24. The exhaust gas flowing in the first front pipe 21 and the second front pipe 22 may flow as still-divided flows of gas through left and right-side exhaust paths within the center pipe 24.

Specifically, the center pipe 24 may be constructed as a so-called dual exhaust pipe having therein a partition plate (not shown) that partitions and separates the left and right exhaust paths. It is also possible to adopt a construction in which the exhaust gases flowing through the first front pipe 21 and the second front pipe 22 merge at the point of mergence A, and flow together in a single exhaust pipe passage that is formed in the center pipe 24.

In the center pipe 24, a catalyst device 25 for exhaust purification is attached immediately downstream of the front ball joint 23. A sub-muffler 26 having a relatively small muffler volume is attached at a position that is a predetermined passage length apart from the catalyst device 25. The catalyst device 25 and the sub-muffler 26 are of known technologies. In addition, the center pipe 24 may also have a construction in which another sub-muffler is attached in place of the catalyst device 25.

At the downstream side of the center pipe 24, there is provided a rear pipe 30 that has a connecting pipe portion 31 that is connected, for example, by flange coupling, to a downstream end portion of the center pipe 24, and that bifurcates from the connecting pipe portion 31 into a branch pipe 32 positioned at one of the left and right sides and a branch pipe 33 positioned at the other one of the left and right sides. Incidentally, the connecting pipe portion 31 may also be coupled to the downstream end portion of the center pipe 24 via a vibration shut-off mechanism such as a ball joint (see, e.g., Japanese Patent Application Publication No. 09-317461 (JP-A-09-317461)).

The rear pipe 30, together with the front pipes 21, 22 and the center pipe 24, constructs an exhaust pipe 20 whose overall configuration is shown in FIG. 2. The exhaust pipe 20 at the downstream side of a branching point B on the exhaust pipe 20 branches into one branch pipe (first branch pipe) 32 and the other branch pipe (second branch pipe) 33. Then, a first main muffler (silencer) 36 is attached to the first branch pipe 32, and a second main muffler (silencer) 37 is attached to the second branch pipe 33.

It is to be noted herein that the first branch pipe 32 and the second branch pipe 33 are different from each other in at least one of bending rigidity and mass so that when the two branch pipes 32, 33 are vibrated in a specific vibration frequency range, the vibrations of the two branch pipes 32, 33 cancel out each other at the branching point B. This provides a structure that staggers the phases of vibration of the first branch pipe 32 and the second branch pipe 33 when the two branch pipes 32, 33 are vibrated in a specific vibration frequency range by exhaust pressure fluctuation (pulsation or the like) during an idle operation.

Concretely, a pipe joint 41 that permits the partial bending of the first branch pipe 32 is provided on the upstream side of the main muffler 36 attached to the first branch pipe 32. Due to the presence of the pipe joint 41, the resonance frequency and the vibration mode of the first branch pipe 32 (including the silencer 36) are different from the resonance frequency and the vibration mode of the second branch pipe 33 (including the silencer 37). Hence, the phases of vibration of the two branch pipes 32, 33 are staggered to substantially opposite phases in a specific vibration frequency range in which an idle vibration unpleasant to occupants occurs, so that the vibrations of the two branch pipes 32, 33 cancel out each other at the branching point B, restraining the transmission of vibration to the upstream side.

The pipe joint 41, as shown in FIG. 3, includes a seal member 42 that is provided on one end-side pipe portion (first end-side pipe portion) 32a of the first branch pipe 32 and that performs a gasket function, an engagement member 43 that is provided on another end-side pipe portion (second end-side pipe portion) 32b of the first branch pipe 32, and a spring element 44 disposed between the first end-side pipe portion and the second end-side pipe portion so as to urge the seal member 42 against the engagement member 43. The pipe joint 41 has a vibration shut-off function as well. This pipe joint 41 connects the first end-side pipe portion 32a and the second end-side pipe portion 32b so that the two end-side pipe portions are oscillatable relatively to each other, and, at the same time, gives a restoration force that maintains and restores the original posture of the two pipe portions 32a, 32b, with the engagement member 43 being in contact with the seal member 42.

The engagement member 43 has a concave spherical engagement surface, and the seal member 42 has a spherical engagement surface, so that the seal member 42 and the engagement member 43 are in a spherical surface slide contact. Therefore, the first branch pipe 32 can be partially bent in arbitrary directions.

In the exhaust pipe 20, the connecting pipe portion 31 on the upstream side of the branching point B between the first branch pipe 32 and the second branch pipe 33 is linked to the center pipe 24. The exhaust pipe 20 is supported on a vehicle body-side member (not shown) by mount brackets m1, m2 provided near two end portions of the center pipe 24, which is an intermediate portion of the exhaust pipe 20. The first main muffler 36 and the second main muffler 37 are supported on the vehicle body-side member via mount brackets m3, m4, respectively, and the first branch pipe 32 and the second branch pipe 33 are supported by the center pipe 24 and by the first and second main mufflers 36, 37.

Next, operation will be described.

During operation of the engine 11, exhaust gases introduced from the exhaust manifolds 12, 13 on the two sides of the engine 11 into the first front pipe 21 and the second front pipe 22 pass through the two front pipes 21, 22 and merge in the center pipe 24. After the exhaust gas passes through the center pipe 24, the exhaust gas divides and flows into one and the other of the left and right second branch pipes 32, 33 in the rear pipe 30, and then is silenced by the first and second main mufflers 36, 37, and is emitted into the atmosphere via exhaust outlets 36a, 37a of the main mufflers 36, 37.

During this state, high-temperature exhaust gas is sequentially discharged from the engine 11 into the exhaust pipe 20 in accordance with a predetermined explosion sequence, so that the exhaust pressure in the exhaust pipe 20 fluctuates according to the rotation of the engine 11. Therefore, during operation of the engine 11, the first branch pipe 32 to which the first main muffler 36 is attached, and the second branch pipe 33 to which the second main muffler 37 is attached are vibrated by pulsation or the like of exhaust pressure in the exhaust pipe 20.

In the first embodiment, in the specific vibration frequency range, that is, an idle vibration range, the vibration of the first branch pipe 32 and the second branch pipe 33 differ in phase from each other, and cancel out each other at the branching point B. Hence, vibrations of the two branch pipes 32, 33 are effectively restrained from being transmitted to the vehicle body side via the center pipe 24. Therefore, it becomes possible to restrain vibration unpleasant to an occupant from occurring in a specific vibration frequency range due to the exhaust structure in which exhaust gas is divided in flow and emitted via the first main muffler 36 and the second main muffler 37.

Besides, while the first branch pipe 32 and the second branch pipe 33 are made substantially the same in arrangement and exhaust pipe passage length, the resonance frequency and the vibration mode of the two branch pipes 32, 33 can be set so that the two branch pipes 32, 33 vibrate in substantially opposite phases in a specific vibration frequency range. Thus, it is possible to effectively restrain the transmission of vibration to the vehicle body side while securing a good exhaust balance between the left and right sides. Furthermore, by adjusting the bending rigidity of the pipe joint 41, it is possible to adjust the resonance frequency of the branch pipe 32 equipped with the pipe joint 41 and the phase of vibration of the branch pipe 32 in a specific vibration frequency range.

Furthermore, it is possible to make the first end-side pipe portion 32a and the second end-side pipe portion 32b of the first branch pipe 32 oscillatable relatively to each other with a predetermined bending rigidity while preventing leakage of exhaust gas at the pipe joint 41 by using the seal member 42. In addition, the degree of freedom in the mount postures of the branch pipes 32, 33 and the main mufflers 36, 37 is heightened, and the more reliable sealing of the pipe joint 41 becomes possible.

Besides, the first branch pipe 32 and the second branch pipe 33 are supported on the vehicle body side so as to be oscillatable according to their respective bending rigidities. The mutual cancellation of the vibrations of the branch pipes 32, 33 at the branching point B can be sufficiently accomplished, and the occurrence of a vibration unpleasant to an occupant can be more effectively restrained.

Figure 4A:
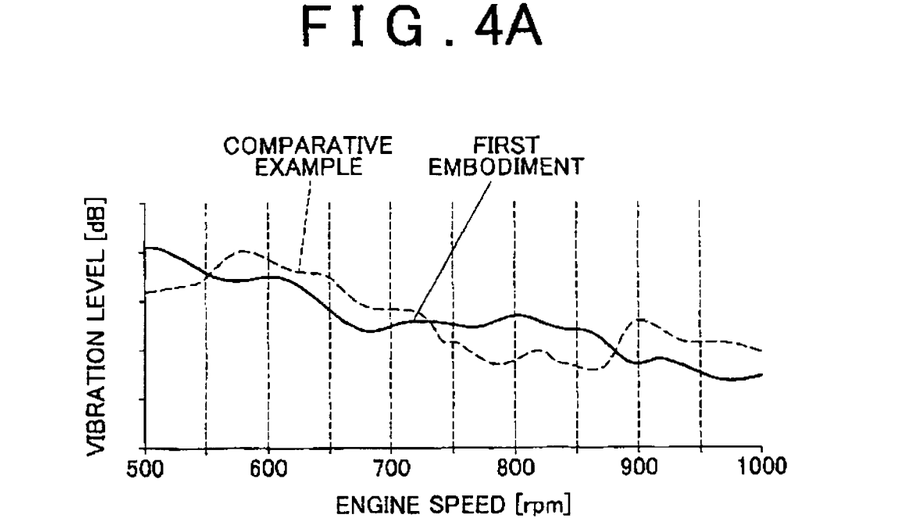
FIG. 4A and 4B are characteristic graphs of vibration transmission in a low vibration frequency range of an exhaust device that has the construction of the first embodiment of the invention, in which solid lines show the first embodiment, and dotted lines show a comparative example.
Figure 4B:
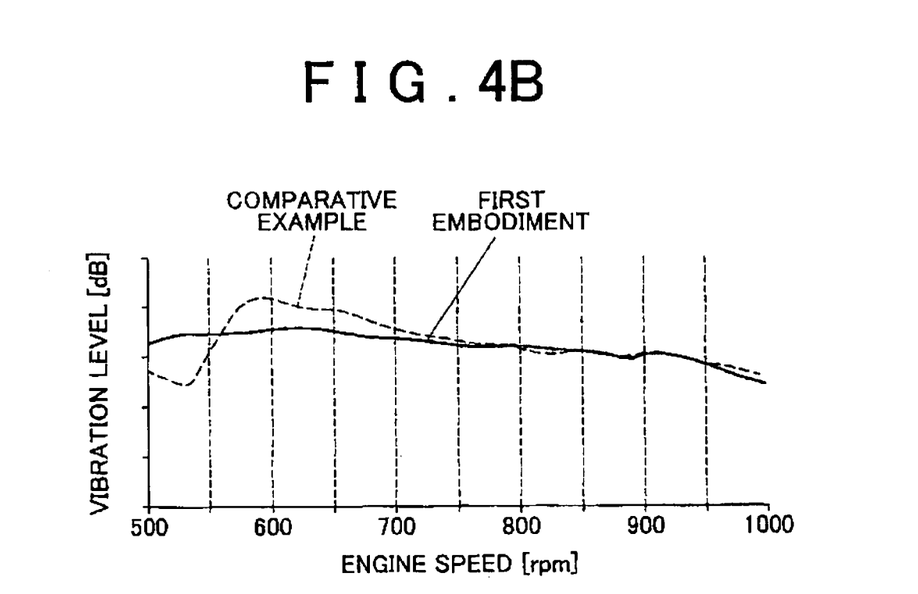

FIGS. 4A and 4B are characteristic graphs of the transmission of vibration in a low vibration frequency range of the exhaust device that has the construction of the first embodiment of the invention.

FIG. 4A shows the vibration level of up-down vibration of a rotation primary component that occurs on the floor under a front seat of the vehicle (beneath driver's feet) when the engine 11 is operated toward an acceleration side in a low rotation speed range (lower than 1000 rpm), in the case where the exhaust device having the foregoing construction of the first embodiment is mounted in the vehicle 1, in comparison with a comparative example. FIG. 4B shows the vibration level of the up-down vibration of the rotation tertiary component near the rear mount of the engine 11, in comparison with a comparative example. In addition, in FIGS. 4A and 4B, the level of vibration that occurs in a vehicle front-seat floor in the first embodiment is shown by solid lines. Besides, dotted lines show levels of vibration occurring in the floor under the vehicle front seat in a construction that employs an exhaust device of a comparative example in which the pipe joint 41 is not provided, and a single branch pipe corresponding to the branch pipe 32 is provided, and the center pipe and the rear pipe are coupled by ball joints. Besides, in the first embodiment, the engine is a four-stroke six-cylinder engine; therefore, exhaust gas is discharged from three cylinders in every rotation of the engine. For example, if the engine speed is 600 rpm, the exhaust pressure in the exhaust pipe 20 fluctuates at a frequency of about 3×600 (rpm)/60 (sec)=30 Hz.

As is apparent from FIG. 4A, in the comparative example, the level of vibration of the rotation primary component deteriorate in an engine rotation speed region (including an idle vibration range) of 550 rpm to slightly above 700 rpm, whereas in the first embodiment, the level of vibration of the rotation primary component in the same region of engine rotation speed is lower by several decibels. Thus, it can be understood that the unpleasant idle vibration of a vehicle cabin floor in the range of 30 Hz to 40 Hz, which is the frequency region of the idle vibration, is sufficiently restrained.

As is apparent from FIG. 4B, the vibration level of the rotation tertiary component is substantially in the same tendency as the rotation primary component, that is, the vibration level of the rotation tertiary component is stably lower in the first embodiment in a range that corresponds to the range of slightly below 30 Hz to 40 Hz in the case of the rotation primary component. Thus, it can be understood that the vibration from the engine 11 and the engine mount 15 side is also reduced. Therefore, it can be understood that the return vibration from the exhaust pipe 20 side to the engine 11 side via the engine mount 15 is restrained, and that the unpleasant idle vibration that occurs beneath the driver's feet due to the transmission of vibration mainly from the engine 11 side and the exhaust pipe 20 side can be sufficiently restrained.

Thus, in the first embodiment, the vibration characteristics of the two branch pipes 32, 33 equipped with the main mufflers 36, 37, respectively, are made different from each so that the vibrations of the first branch pipe 32 and the second branch pipe 33 in a specific vibration frequency range cancel out each other at the branching point B between the two pipes and therefore the transmission of vibration to the vehicle body side is restrained. Hence, the first embodiment can restrain vibration unpleasant to an occupant from occurring in a cabin floor beneath the driver's feet or the like due to the exhaust structure in which exhaust gas is divided in flow and emitted via the two main mufflers 36, 37.

Figure 5:
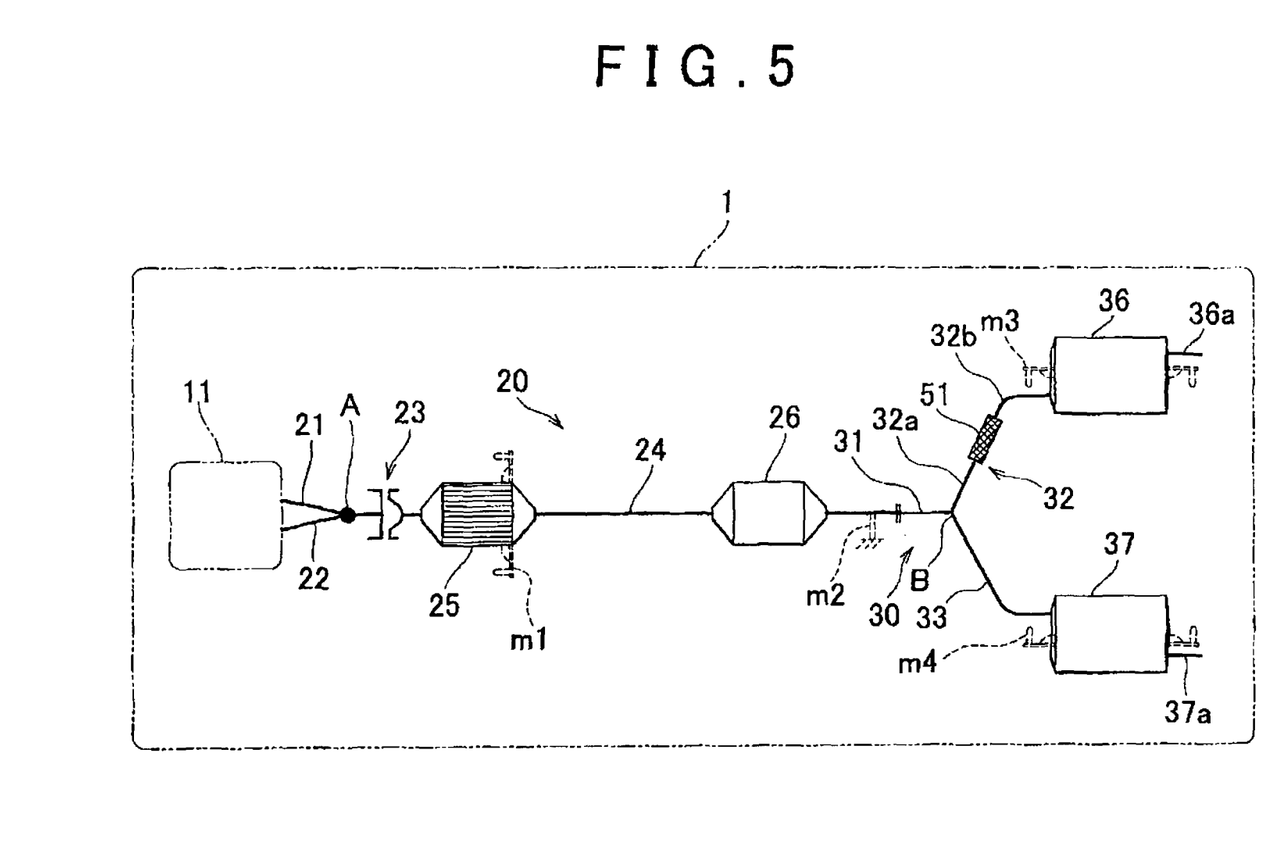
FIG. 5 is a schematic diagram showing a general construction of an exhaust device for a vehicle internal combustion engine in accordance with a second embodiment of the invention.

(Second Embodiment) FIG. 5 is a schematic diagram showing a general construction of an exhaust device for a vehicle internal combustion engine in accordance with a second embodiment of the invention. The second embodiment is substantially the same in the overall construction as the foregoing first embodiment, and is different therefrom merely in the pipe joint portion. The same or like component elements or the like are represented in FIG. 5 by the same reference characters as the corresponding elements or the like in FIGS. 1 to 3, and only differences will be described in detail below.

In second embodiment, a flexible pipe-shape member 51 intervening between a first end-side pipe portion 32a and a second end-side pipe portion 32b of a first branch pipe 32 is provided as a pipe joint for making the bending rigidity of the first branch pipe 32 and the bending rigidity of a second branch pipe 33 greatly different from each other. This flexible pipe-shape member 51 is constructed of, for example, a flexible pipe for use for an exhaust pipe described in Japanese Patent Application Publication No. 5-1532 (JP-A-5-1532), or a known flexible metal tube made of stainless steel.

In the second embodiment, the flexible pipe-shape member 51 prevents leakage of exhaust gas between the first end-side pipe portion 32a and the second end-side pipe portion 32b of the first branch pipe 32, and also connects the first end-side pipe portion 32a and the second end-side pipe portion 32b of the first branch pipe 32 so that the two pipe portions 32a, 32b is oscillatable relatively to each other with a predetermined bending rigidity. Therefore, the vibrations in a specific vibration frequency range of the first branch pipe 32 and the second branch pipe 33 equipped with the main mufflers 36, 37, respectively, cancel out each other at the branching point B between the branch pipes 32, 33, and therefore the transmission of vibration to the vehicle body side can be restrained. Thus, substantially the same effects as in the first embodiment can be expected.

Although the foregoing embodiments employ the pipe joint 41 or the flexible pipe-shape member 51 capable of functioning as a vibration shut-off mechanism in order to make the bending rigidities of the first branch pipe 32 and the second branch pipe 33 different from each other, the pipe joint for making the vibration mode or the resonance frequency of one of the two branch pipes different from that of the other branch pipe may also be a pipe joint of a different type that permits the two branch pipes to oscillate relatively to each other. Besides, although the foregoing embodiments are described in conjunction with a V-type six-cylinder engine as an example, the invention can also be applied to other engines, for example, an in-line four-cylinder engine, with its idle vibration range (20 Hz to 25 Hz) being set as a specific vibration frequency range. A specific vibration frequency range in which the difference between the phases of vibration of the two branch pipes 32, 33 needs to be made large can be appropriately set by, for example, making the masses of the main mufflers 36, 37 or the branch pipes 32, 33 or the bending rigidity of the pipe joint 41 different from those in the foregoing embodiments. Furthermore, although in either one of the embodiments, the pipe joint 41 or the flexible pipe-shape member 51 is attached to the branch pipe 32 that is disposed on the right side in the vehicle 1 in order to make the bending rigidities of the branch pipes 32, 33 greatly different from each other, it should be apparent that the left-right arrangement may be reversed, that is, the pipe joint 41 or the flexible pipe-shape member 51 may be attached to the left-side branch pipe 33.

As described above, the invention is constructed so that the vibrations in a specific vibration frequency range of one (first) branch pipe equipped with a silencer and another (second) branch pipe also equipped with a silencer cancel out each other, so that the transmission of vibration to the vehicle body side is restrained. Therefore, the invention is able to restrain vibration unpleasant to an occupant from occurring due to the exhaust structure in which exhaust gas is divided in flow and emitted via the two silencers. The invention is useful to exhaust devices for vehicle internal combustion engines and, in particular, is useful generally to the exhaust devices for vehicle internal combustion engines which are constructed so that exhaust gas from a multi-cylinder internal combustion engine mounted in a vehicle is emitted to the outside after being divided and led to at least two silencers via branch pipes.

The invention claimed is:

1. An exhaust device for an vehicle internal combustion engine, comprising:
an exhaust pipe of the internal combustion engine mounted in a vehicle which branches at a branching point into a downstream-side first branch pipe and a downstream-side second branch pipe;
a first silencer attached to the first branch pipe;
a second silencer attached to the second branch pipe; and
a pipe joint that is provided on an upstream side of the silencer provided on one branch pipe out of the first branch pipe and the second branch pipe, and that permits the one branch pipe to partially bend at the upstream side of the silencer,
wherein the first branch pipe and the second branch pipe are different from each other in at least one of bending rigidity and mass to result in different resonant frequencies in the first branch pipe and the second branch pipe so that when the first branch pipe and the second branch pipe are vibrated in a specific vibration frequency range, vibrations of the first and second branch pipes cancel out each other at the branching point.

2. The exhaust device according to claim 1, wherein the specific vibration frequency range is a range of vibration frequency occurring during an idle operation of the internal combustion engine, and phases of the vibrations of the first branch pipe and the second branch pipe are different from each other.

3. The exhaust device according to claim 1, wherein a resonance frequency or a vibration mode of each of the first branch pipe and the second branch pipe is set so that the first branch pipe and the second branch pipe vibrate in substantially opposite phases in a specific vibration frequency range.

4. The exhaust device according to claim 1, wherein the pipe joint includes: a seal member provided on a one end-side pipe portion of the one branch pipe; an engagement member provided on another end-side pipe portion of the one branch pipe; and a spring element intervening between the one end-side pipe portion and the another end-side pipe portion so as to urge the seal member against the engagement member, wherein the one end-side pipe portion and the another end-side pipe portion are connected so as to be oscillatable relatively to each other, with the engagement member being in contact with the seal member.

5. The exhaust device according to claim 4, wherein the engagement member and the seal member are in a spherical contact with each other, and the one branch pipe is partially bendable in an arbitrary direction.

6. The exhaust device according to claim 1, wherein the pipe joint is made up of a flexible pipe-shape member that intervenes between the one end-side pipe portion of the one branch pipe and the another end-side pipe portion of the one branch pipe.

7. The exhaust device according to claim 1, wherein the exhaust pipe is supported on a vehicle body side of the vehicle, at an intermediate portion of the exhaust pipe upstream of the branching point at which the exhaust pipe branches into the first branch pipe and the second branch pipe, and the first silencer and the second silencer are each supported on the vehicle body side of the vehicle, and the first branch pipe and the second branch pipe are supported by the intermediate portion and the first and second silencers.

* * * * *